United States Patent
Reech et al.

(10) Patent No.: US 8,745,577 B2
(45) Date of Patent: Jun. 3, 2014

(54) END TO END AUTOMATION OF APPLICATION DEPLOYMENT

(75) Inventors: Christopher D. Reech, Austin, TX (US); Steven O. Twist, Sutherland (AU)

(73) Assignee: International Business Machines Corporation, Armonk, NY (US)

(*) Notice: Subject to any disclaimer, the term of this patent is extended or adjusted under 35 U.S.C. 154(b) by 341 days.

(21) Appl. No.: 12/893,084

(22) Filed: Sep. 29, 2010

(65) Prior Publication Data
US 2012/0079450 A1    Mar. 29, 2012

(51) Int. Cl.
G06F 9/44 (2006.01)
(52) U.S. Cl.
USPC ............... 717/104; 717/162; 717/168
(58) Field of Classification Search
None
See application file for complete search history.

(56) References Cited

U.S. PATENT DOCUMENTS

| | | | |
|---|---|---|---|
| 7,150,000 B1* | 12/2006 | Feldman | 717/103 |
| 7,155,380 B2 | 12/2006 | Hunt et al. | |
| 7,814,459 B2* | 10/2010 | Behnen et al. | 717/104 |
| 2006/0031248 A1 | 2/2006 | Vinberg et al. | |
| 2006/0080656 A1* | 4/2006 | Cain et al. | 717/174 |
| 2007/0044067 A1* | 2/2007 | Feldman | 717/104 |
| 2007/0055972 A1* | 3/2007 | Brown et al. | 717/174 |
| 2007/0088630 A1 | 4/2007 | MacLeod et al. | |
| 2007/0288885 A1* | 12/2007 | Brunel et al. | 717/104 |
| 2008/0034015 A1* | 2/2008 | Behnen et al. | 707/204 |
| 2008/0040364 A1* | 2/2008 | Li | 707/100 |
| 2008/0270973 A1 | 10/2008 | Edwards et al. | |
| 2010/0262558 A1* | 10/2010 | Edwards et al. | 705/348 |
| 2011/0004564 A1* | 1/2011 | Rolia et al. | 705/348 |

OTHER PUBLICATIONS

OMG Unified Modeling Language (OMG UML), Superstructure, V2.1.2, OMG, copyright 2001-2003.*
Balasubramanian, et al., Developing Applications Using Model-driven Design Environments, IEEE Computer, pp. 1-8.

* cited by examiner

Primary Examiner — Insun Kang
(74) Attorney, Agent, or Firm — Schmeiser, Olsen & Watts; John Pivnichny

(57) ABSTRACT

Automatic deployment of an information technology (IT) system instance having hardware and software components. An application model of the software components is generated based on use cases and is associated with functional and non-functional requirements. An infrastructure model of the hardware components is generated based on the application model. The same software component modeling language represents both the application and infrastructure models. A markup language computer file is generated to include a design of the IT system instance and instructions for accessing library-stored assets that specify the hardware and software components. The computer file is exported to a deployment tool for automatic deployment of the IT system instance based on carrying out the instructions. In one embodiment, the impact of a proposed change is identified and managed in real time prior to a deployment of the proposed change.

21 Claims, 7 Drawing Sheets

US 8,745,577 B2

END TO END AUTOMATION OF APPLICATION DEPLOYMENT

TECHNICAL FIELD

The present invention relates to a data processing method and system for automating application deployment, and more particularly to a system modeling technique that exports output from application modeling and infrastructure modeling to an application deployment tool.

BACKGROUND

Application developers and application system integrators often use software-based tools to design the application architecture to solve a business need. The business, system, and component functional and non-functional requirements are identified to facilitate the design. Subsequently, a software-based modeling tool is used to develop use cases, system context diagrams, component models, deployment models and data flow diagrams. Code is then written (or a software package is purchased) and a tool is used as a repository to hold an "application bundle" for deployment. An infrastructure information technology (TT) architect then designs the physical environment to host the application bundle. The infrastructure IT architect repeats a large amount of the previously captured information which may or may not be made available to them, such as the business, system, and component functional and non-functional requirements. The same modeling tools are then used to develop a second set of use cases, system context diagrams, component models, deployment models and data flow diagrams, where an IT infrastructure design is produced that captures the "run time environment" for the application and the infrastructure (i.e., hardware, operating system and middleware) bundle. A systems engineer builds the run time environment (i.e., install and configure switches, servers, operating systems, etc.) and then an applications engineer installs the application bundle. In known techniques for deploying an application, the respective design processes of the application developer and the infrastructure IT architect are disjointed, resulting in an unacceptable amount of application and infrastructure defects, inflexible application components and infrastructure building blocks, and significant costs related to lengthy infrastructure design times and infrastructure and application deployment times. Furthermore, the disjointedness between the design processes of the application developer and the infrastructure IT architect makes it difficult to identify and manage the impact of a change in a requirement in real time prior to the phase of deploying an application. Thus, there exists a need to overcome at least one of the preceding deficiencies and limitations of the related art.

BRIEF SUMMARY

First embodiments of the present invention provide a computer-implemented method of automatically deploying an information technology (IT) system instance having hardware and software components The method comprises:

a computer system generating an application model of the software components based on use cases associated with a plurality of requirements that includes functional and non-functional requirements of the IT system instance, wherein the generating the application model includes representing the software components in a software component modeling language;

the computer system generating an infrastructure model based on the application model, wherein the generating the infrastructure model includes representing the hardware components in the software component modeling language;

the computer system generating a computer file in a markup language, wherein the computer file includes a design of the IT system instance, and further includes first instructions for accessing first assets stored in an infrastructure runtime source library and second instructions for accessing second assets stored in a software source library, and wherein the first assets specify the hardware components and the second assets specify the software components; and the computer system exporting the computer file in the markup language to a deployment tool, wherein a result of the exporting the computer file to the deployment tool is an automatic deployment of the IT system instance based on carrying out the first and second instructions included in the computer file to access the first and second assets stored in the infrastructure runtime source library and the software source library, respectively.

Second embodiments of the present invention provide a computer-implemented method of modeling a proposed change to an information technology (IT) system instance prior to deploying the IT system instance having the proposed change. The method comprises:

subsequent to an identification of a first system model of the IT system instance as a first baseline of the IT system instance and a subsequent identification by a configuration management system of a first change deployed in the IT system instance, the computer system receiving an indication of the first change exported from the configuration management system;

subsequent to receiving the indication of the first change deployed in the IT system instance, the computer system updating the first system model of the IT system instance to a second system model that includes the first change and exporting a computer file in a markup language to the configuration management system, wherein the computer file includes the second system model that includes the first change, and wherein a result of the exporting the computer file is an identification of the second system model as an updated baseline of the IT system instance by the configuration management system; and subsequent to exporting the computer file that includes the second system model that includes the first change, the computer system receiving and modeling the proposed change to the IT system instance prior to a deployment of the IT system instance having the proposed change, wherein the modeling the proposed change is based on the updated baseline of the IT system instance rather than the first baseline of the IT system instance.

Corresponding to the above-summarized methods, program products and processes for supporting computing infrastructure where the process provides at least one support service are also described and claimed herein.

Embodiments of the present invention provide a technique for automating application or system deployment that creates an end to end traceability matrix that maps business, system and component functional and non-functional requirements to application and infrastructure models, thereby ensuring that at either the application or infrastructure modeling phase, the impact of a change in a requirement may be identified and managed in real time, rather than waiting for the deployment phase. Further, the models used by an application developer team may be leveraged as direct input into the infrastructure design, thereby reducing infrastructure design times, especially if predefined infrastructure building blocks are utilized (e.g., predefined server configurations). Still further, infrastructure and application deployment times are reduced by embodiments described herein. Further yet, embodiments of the present invention may reduce application and infrastructure defects during testing and deployment phases, and implementation project costs may be reduced. Moreover, infrastructure building blocks may be provided as reusable assets stored in a library, thereby providing a standardized approach to developing infrastructure designs that reduces the development time and costs of producing infrastructure solutions.

DETAILED DESCRIPTION

1. Overview

Using a service-oriented architecture (SOA) approach to application development and systems integration in the software space allows for the generation of executable code into a software repository that can subsequently be deployed to a target. Embodiments of the present invention extend the aforementioned SOA approach to infrastructure design. A software bundle (a.k.a. application bundle; i.e., the software-based application or system that is to be deployed to satisfy business requirements) and an infrastructure stack (i.e., the hardware components that are required to run the application or system to be deployed) may be defined in the same format, which can be understood by an automated deployment tool. Thus, an application or a complete system may be modeled and deployed, end to end automatically, without intervening steps that are manually performed by one or more humans.

The end to end automation of application deployment links all phases in the design of the application and the subsequent deployment of the application to business requirements, thereby treating the software and infrastructure design phases of application deployment as a single, integrated system (rather than as isolated phases). Embodiments of the present invention may create a complete system model that integrates application and infrastructure models, where the system model is exported to an automated deployment tool as a deployable system. Use case, system context and deployment models may be generated and converted into defined components of the system model.

2. System for Automating Application Deployment

Figure 1:
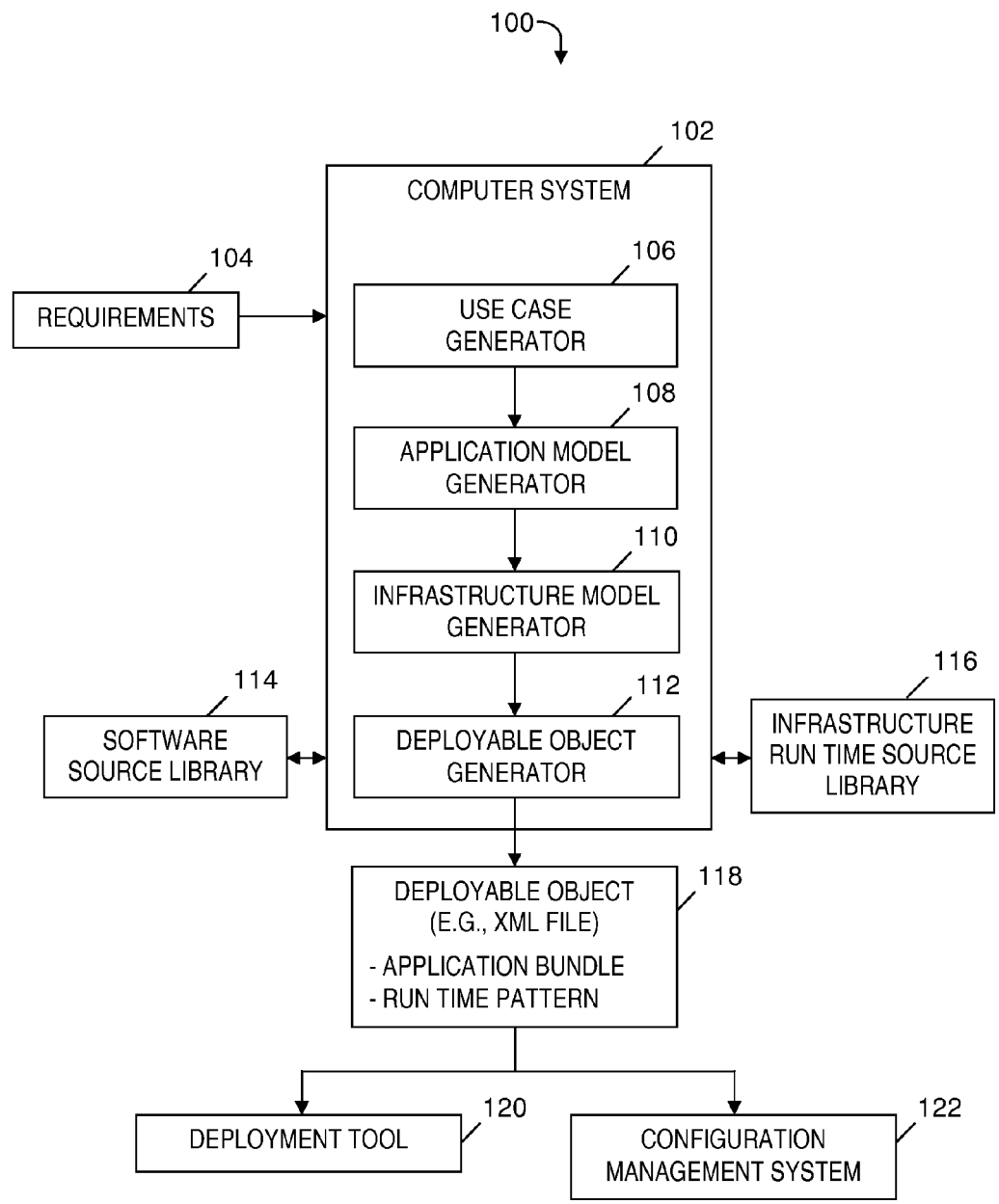
FIG. 1 is a block diagram of a system for automating application deployment, in accordance with embodiments of the present invention.

FIG. 1 is a block diagram of a system for automating application deployment, in accordance with embodiments of the present invention. System 100 includes a computer system 102 that receives business, system, and component functional and non-functional requirements 104 that need to be satisfied by an information technology (IT) system instance that is to be modeled and deployed. As used herein, an IT system instance is defined as a system that satisfies functional and non-functional requirements, and that includes one or more software components of at least one software application and one or more hardware components that are required to run the software application(s).

It should be noted that systems and processes described herein that deploy an IT system instance have alternate embodiments in which the IT system instance may be replaced with an application (a.k.a. software application), where the referenced hardware components of the IT system instance include hardware that is necessary to run the application. Similarly, systems and processes described herein that deploy an application have alternate embodiments in which the application may be replaced with an IT system instance.

Computer system 102 includes a use case generator 106, an application model generator 108, an infrastructure model generator 110, and a deployable object generator 112. Use case generator 106 develops use cases that are included in the design of an application bundle (a.k.a. software bundle) of the IT system instance that is going to be deployed. Application model generator 108 is a modeling tool that uses the use cases developed by generator 106, along with system context diagrams, component models, deployment models, and data flow diagrams to model the application bundle. The model of the application bundle is expressed a software component modeling language. In one embodiment, the software component modeling language is the Unified Modeling Language (UML) 2.x, such as UML 2.0. The output of application model generator 108 is used as input to infrastructure model generator 110, which develops a model of the infrastructure that is required to run the software in the aforementioned application bundle. The model of the infrastructure includes a representation of the run time environment (a.k.a. run time pattern) needed to host the application bundle. The run time environment includes a specification of the physical environment required to host the application bundle (e.g., switches, server computers, and other hardware) and may include other infrastructure components such as an operating system and middleware. The model of the infrastructure is expressed in the same software component modeling language that is used to express the model of the application bundle. Hereinafter, the model of the application bundle is simply referred to as "application model" and the model of the infrastructure is simply referred to as "infrastructure model."

System 100 also includes a software source library 114 and an infrastructure run time source library 116. Deployable object generator 112 builds a computer file in a markup language, where the computer file includes a deployable object 118 that specifies the application bundle and the run time pattern. In one embodiment, the markup language is Extensible Markup Language (XML). The application bundle is a list of software that is going to be deployed, a description of how the software is going to be deployed, and where the software is going to be deployed. The run time pattern identifies the hardware on which the software identified by the application bundle is to be implemented and specifies the configuration of the hardware. Effectively, the run time pattern is an infrastructure build sheet.

To build the computer file, deployable object generator 112 searches library 114 for previously stored software components that are included in the application bundle and retrieves any software components found in the search. A previously stored software component may be code written or a software package purchased for an application bundle. Similarly, deployable object generator 112 searches library 116 for previously stored configuration information about infrastructure components that are included in the infrastructure model, and retrieves any configuration information found in the search. Computer system 102 may also deposit software components into software source library 114 and infrastructure components into infrastructure run time source library 116 as reusable assets that a deployment of any other IT system instance or application may use to create a deployable object 118.

The application bundle and the run time pattern may be identified in a single repository or in two data repositories. If two repositories are used, then the repository software is the same for both repositories. For example, the repository software may be IBM® Rational® Asset Manager or IBM® Rational® ClearCase®, which are software products that are offered by International Business Machines located in Armonk, N.Y.

Computer system 102 sends deployable object 118 to an automated deployment tool 120. In response to receiving the deployable object 118, deployment tool 120 automatically deploys the IT system instance based on the application bundle and the run time pattern in the received deployable object.

Computer system 102 optionally sends deployable object 118 as input to a configuration management system 122, which uses the deployable object to define a baseline of configurable items for the IT system instance.

The functionality of the components of system 100 is further discussed below relative to FIG. 2 and FIG. 3.

3. Process for Automating Application Deployment

Figure 2:
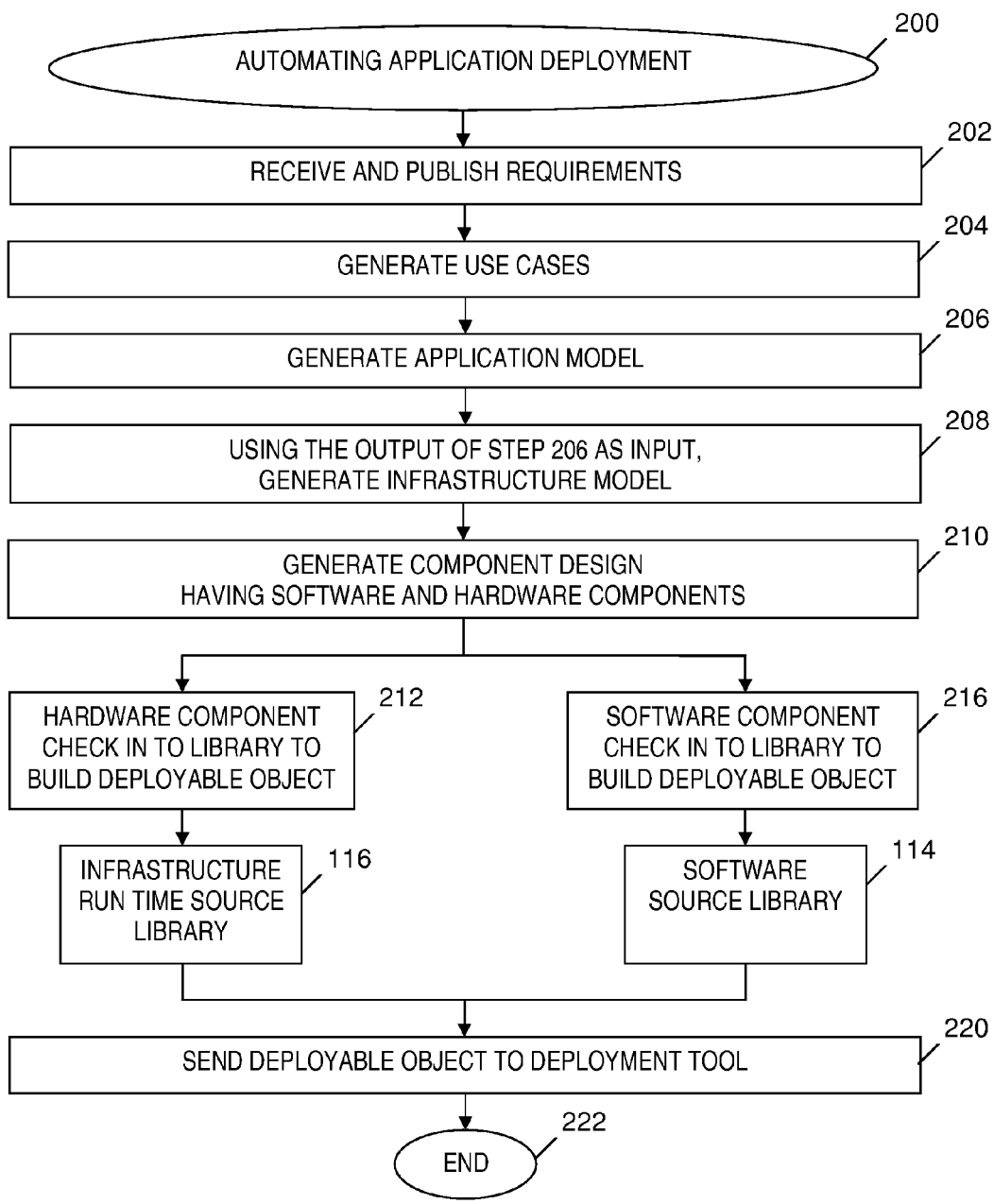
FIG. 2 is a flowchart of a process for automating application deployment, where the process is implemented by the system of FIG. 1, in accordance with embodiments of the present invention.

FIG. 2 is a flowchart of a process for automating application deployment, where the process is implemented by the system of FIG. 1, in accordance with embodiments of the present invention. The process of automating application deployment begins at step 200. In step 202, computer system 102 (see FIG. 1) receives and publishes requirements 104 (see FIG. 1). In step 204, use case generator 106 (see FIG. 1) generates use cases for an application model. In step 206, application model generator 108 (see FIG. 1) generates the application model based on the use cases generated in step 204. The application model generated in step 206 includes software components of an application bundle expressed in a software component modeling language such as UML 2.x.

Using the output of step 206 as input, infrastructure model generator 110 (see FIG. 1) generates an infrastructure model in step 208. The infrastructure model generated in step 208 is expressed in the same software component modeling language that is used to express the application model in step 206. The infrastructure model includes a run time pattern that includes configuration information about infrastructure components (i.e., components of the infrastructure needed by the application being deployed).

In step 210, a modeling tool running in computer system 102 (see FIG. 1) generates a system model. The generated system model includes a component design, which comprises the software components of the application bundle included in the application model generated in step 206. The system model generated in step 210 also includes a run time pattern that includes configuration information about the hardware and other infrastructure components of the infrastructure model generated in step 208.

In step 212, deployable object generator 112 (see FIG. 1) initiates a building of a run time pattern in deployable object 118 (see FIG. 1). Step 212 also includes computer system 102 checking in to the infrastructure run time source library 116 to determine whether library 116 has stored any configuration information of the hardware components of the infrastructure model as reusable assets. If any of the configuration information for the hardware components of the infrastructure model are included in library 116, the computer system 102 (see FIG. 1) retrieves the configuration information for the hardware components from library 116 and deployable object generator 112 (see FIG. 1) adds the retrieved configuration information to the run time pattern being built in deployable object 118 (see FIG. 1).

In step 216, deployable object generator 112 (see FIG. 1) initiates a building of an application bundle in deployable object 118 (see FIG. 1). Step 216 also includes computer system 102 checking in to the software source library 114 to determine whether library 114 has stored any of the software components of the application model as reusable assets. If any of the software components of the application model are stored in library 114, the computer system 102 (see FIG. 1) retrieves the software components from library 114 and the deployable object generator 112 (see FIG. 1) adds the retrieved software component(s) to the application bundle being built in deployable object 118 (see FIG. 1).

In step 220, computer system 102 (see FIG. 1) sends deployable object 118 (see FIG. 1) to deployment tool 120 (see FIG. 1). In response to receiving the deployable object, the deployment tool automatically deploys the application. In step 222, the process of automating application deployment ends.

In one embodiment, the steps 206, 208, 210, 212, 216 and 220 are performed automatically and without intervening steps manually performed by one or more humans.

Again, in another embodiment, the deployment of the application described in the process of FIG. 2 is replaced with the deployment of an IT system instance.

4. Determining Impact of Proposed Change Prior to Deployment

Figure 3A:
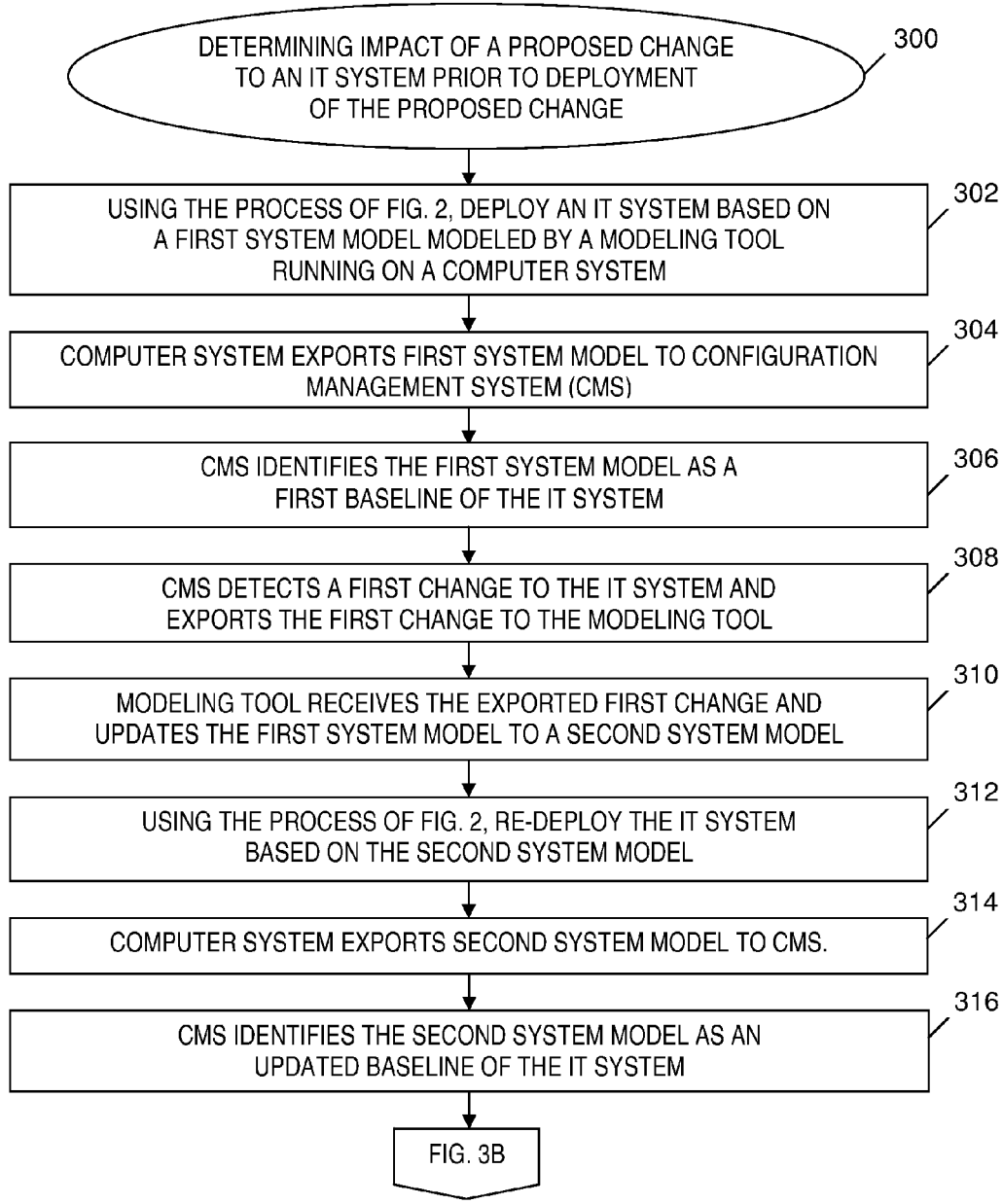
FIG. 3 is a flowchart of a process for determining an impact of a proposed change to a system prior to automatically deploying the proposed change by the process of FIG. 2, where the process is implemented by the system of FIG. 1, in accordance with embodiments of the present invention.
Figure 3B:
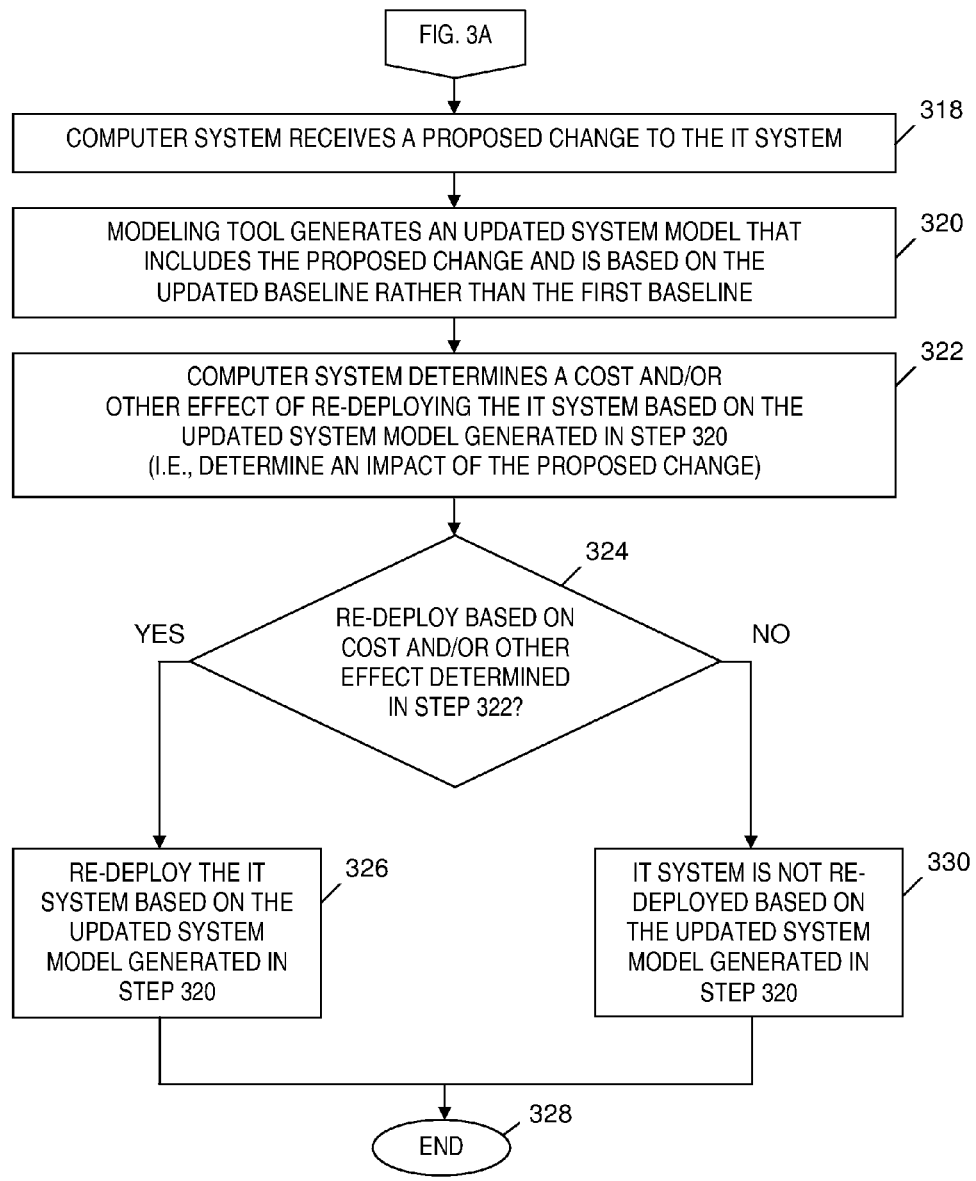

FIGS. 3A-3B depict a flowchart of a process for determining an impact of a proposed change to a system prior to automatically deploying the proposed change by the process of FIG. 2, where the process is implemented by the system of FIG. 1, in accordance with embodiments of the present invention. The process for determining an impact of a proposed change to an IT system instance begins at step 300 in FIG. 3A. In step 302, the process of FIG. 2 deploys an IT system instance based on a first system model modeled by a modeling tool running on computer system 102 (see FIG. 1). In step 304, the computer system 102 (see FIG. 1) exports the first system model to configuration management system 122 (see FIG. 1).

In step 306, configuration management system 122 (see FIG. 1) identifies the first system model as a first baseline of the IT system instance. In step 308, configuration management system 122 (see FIG. 1) detects a first change to the IT system instance and exports the first change to the modeling tool. In step 310, the modeling tool receives the exported first change and updates the first system model to a second system model that includes the first change, where the second system model is different from the first system model.

In step 312, the process of FIG. 2 re-deploys the IT system instance based on the second system model. That is, the re-deployed IT system instance includes the first change. In step 314, the computer system 102 (see FIG. 1) exports the second system model to configuration management system 122 (see FIG. 1). In step 316, configuration management system 122 (see FIG. 1) identifies the second system model as an updated baseline of the IT system instance. The process of determining the impact of a proposed change to an IT system instance continues in FIG. 3B.

In step 318 in FIG. 3B, the modeling tool receives a proposed change to the IT system instance, where the proposed change is different from the first change detected in step 308 (see FIG. 3A). In step 320, the modeling tool generates an updated system model that includes the proposed change received in step 318. The updated system model generated in step 320 is based on the updated baseline identified in step 316 (see FIG. 3A) rather than on the first baseline identified in step 306 (see FIG. 3A). The updated system model is different from the first and second system models on which the deployments in step 302 (see FIG. 3A) and step 312 (see FIG. 3A), respectively, are based.

In step 322, the computer system 102 (see FIG. 1) determines a cost and/or another effect of re-deploying the IT system instance based on the updated system model that includes the proposed change and is generated in step 320. That is, step 322 determines an impact of the proposed change.

Inquiry step 324 includes determining whether to re-deploy the IT system instance based on a comparison of the impact determined in step 322 to predefined criteria. Step 324 may be performed manually or automatically by computer system 102 (see FIG. 1). If the comparison of the impact of the proposed change to the predefined criteria determines that the IT system instance is to be re-deployed, then the Yes branch of step 322 is followed and step 326 is performed. In step 326, the IT system instance is re-deployed based on the updated system model that includes the proposed change. The IT system instance may be re-deployed based on the updated system model by using steps 212, 216 and 220 of FIG. 2 to build deployable object 118 (see FIG. 1) based on the hardware and software components represented in the updated system model. Following step 326, the process of determining the impact of the proposed change to the IT system instance ends at step 328.

Returning to step 324, if the comparison of the impact of the proposed change to the predefined criteria determines that the IT system instance is not to be re-deployed, then in step 330, the IT system instance is not re-deployed based on the updated system model generated in step 320, and the process of determining the impact of the proposed change to the IT system instance ends at step 328.

5. UML-Based Infrastructure Models

This section describes a metamodel that defines UML model elements that allows UML modeling techniques to design an infrastructure model (a.k.a. deployment model) in the same software component modeling language (i.e., UML) that is used to design the corresponding application model. The result of step 208 (see FIG. 2) may express the infrastructure model with the UML model elements described in this section. Generating a UML-based infrastructure model provides a consistent approach for developing a solution design (i.e., design of an IT system instance), allows for re-use of solution designs, and is a first step to generating system build guides that are used as input to automated build systems such as IBM® Tivoli® Provisioning Manager offered by International Business Machines Corporation.

5.1 UML Modeling

A model is defined as a representation of a system or application. A UML model is a model that uses a Unified Modeling Language notation to graphically represent a system at various levels of abstraction.

Models may represent systems at different levels of detail. Some models describe a system from a higher, more abstract level, while other models provide greater detail. UML models include model elements, such as actors, use cases, classes, and packages, and one or more diagrams that show a specific perspective of a system. A model may also include other, more detailed models.

IT Architects may use UML models to perform the following actions:
Visually represent a system that will be built
Communicate a vision of a system to customers and colleagues
Develop and test system architecture
Use the UML diagrams to direct code generation The use of UML models by IT Architects to develop infrastructure models allow the development of the infrastructure run time source library 116 (see FIG. 1), which is leveraged to provide a standard approach to developing solution designs for clients. This UML model-based approach to developing infrastructure models reduces the development time and cost for producing infrastructure solutions.

In the case of an Infrastructure IT Architect, the code generation that is directed by UML-based infrastructure models produce the instructions and/or configuration files that are exported in an XML format in deployable object 118 (see FIG. 1) and used as input to an automation system (e.g., deployment tool 120 in FIG. 1) to implement the infrastructure components of an application or system. For example, an XML file produced from a UML-based infrastructure model may be input into IBM® Tivoli® Provisioning Manager (TPM), providing TPM with the configuration information and run instructions that TPM needs to provision a new server onto a network.

5.2 Tooling

To generate the infrastructure model in embodiments of the present invention, an IT Architect may use, for example, IBM® Rational® Software Modeler (RSM) if the full functionality of IBM® Rational® Software Architect (RSA) is not required. RSM and RSA are software products offered by International Business Machines Corporation. RSM provides an Eclipse based workbench that allows IT Architects to produce common work products such as:
Use Case
System Context Diagram
Architecture Overview Diagram
Component Model
Deployment Model RSM integrates with IBM® Rational® RequisitePro® and has plug-ins to enable linkages with iRAM, an internal shared IBM® Rational® Asset Manager system, and a document generator to export UML models into traditional Microsoft® Word format. IBM® Rational® RequisitePro® and iRAM are software products offered by International Business Machines Corporation. Microsoft® Word is word processing software offered by Microsoft Corporation located in Redmond, Wash.

RSA may be used, for example, by the Application Architect or Developer to provide the functional components for the end to end system. RSA may also be used by the IT Architect in place of RSM.

Rational® Asset Manager (RAM) may be used for capturing and publishing reusable assets. RAM has a direct plug-in to RSA and RSM, which allows models to be published directly into repositories to enable the build-up of reference libraries, such as library 114 and 116 (see FIG. 1).

5.3 Notation

The following subsections describe the UML model elements (i.e., the metamodel) that are used to model an IT system instance, allowing for the development of an infrastructure model.

5.3.1 Node

A Node is the modeling element used to represent the instantiation of a physical device such as a server, switch or storage array. The Node describes the physical entity being deployed to be managed within an infrastructure model.

Using stereotypes within RSM, Nodes may also be represented diagrammatically in a manner similar to the Microsoft® Visio® format with which IT Architects are familiar.

5.3.2 Artifact

There are two types of Artifact that is used in the infrastructure models generated by embodiments of the present invention. The first type of Artifact is used to model hardware specifications for the physical device that will be deployed. Examples of a hardware specification Artifact is an <<artifact>> called IBM DS6000.

The second type of Artifact is used to represent a software package or component that is to be installed on a physical device represented by a Node corresponding to the Artifact. Software such as DB2®, Veritas Volume Manager and WebSphere® Application Server are examples of software package Artifacts. DB2® and WebSphere® Application Server are offered by International Business Machines Corporation. Veritas Volume Manager is a software product offered by Symantec Corporation located in Mountain View, Calif.

Artifacts are manifest within a Node and appear as Attributes of the Node that the Artifacts have been associated with. In this way, a Node may have a number of hardware specifications and software packages "installed" thereon to make the Node the entity that is to be deployed.

5.3.3 Execution Environment

Execution Environments are used to model bundles of software package Artifacts or operating systems. An example of an Execution Environment is IBM® Management Tools offered by International Business Machines Corporation, where there are a number of Artifacts that are grouped together as a bundled installation.

Within UML, an Execution Environment is actually a Node with a specific description. As a Node, an Execution Environment may be associated with Artifacts. Execution Environments are "nested" within a Node and, once there, then appear as Attributes of the parent Node. In the case of IBM® Management Tools, the <<executionEnvironment>> may consist of the software <<artifacts>> IBM® Tivoli® Monitoring (ITM), IBM® Tivoli® Storage Manager (TSM) and Server Resource Manager (SRM). ITM, TSM and SRM are software products offered by International Business Machines Corporation.

5.3.4 Deployment Specification

A Deployment Specification is used to model security zones or other deployment domains such as locations. Deployment Specifications may be used to model the "Application Tier" of a 3-tier architecture or may be used to bound a deployment location such as a Data Center, communications room or office space. Deployment Specifications may also be used to represent a clustered environment in which all of the Nodes within the Deployment Specification are part of the same cluster.

5.3.5 Attributes

As discussed in the subsection on Artifacts presented above, each UML model element may be associated with one or more Attributes that are used to provide further configuration information for the associated element. The Attributes for a hardware specification Artifact may be, for example, the amount and type of memory installed, local disk, I/O and CPU description, whereas for a software package Artifact, the Attributes may be, for instance, the version of the release or patch level of the software package.

When Artifacts are associated with a Node, the Artifacts are represented within the Node as attributes of that Node. Nested Nodes such as an Execution Environment are also represented as Attributes of the parent Node.

5.3.6 Connections

To model the connectivity between two Nodes, the "Communication Path" UML element is used. Details about the communication path and its configuration are included in the Documentation section of the Communication Path UML element. Communication protocol such as Hypertext Transfer Protocol (HTTP), Transmission Control Protocol (TCP), etc. label the communications paths.

Association lines are used to link Artifacts to Nodes. Association lines show that the Artifact is linked or a part of (manifest on) the Node.

5.3.7 Notation Example

Figure 4:
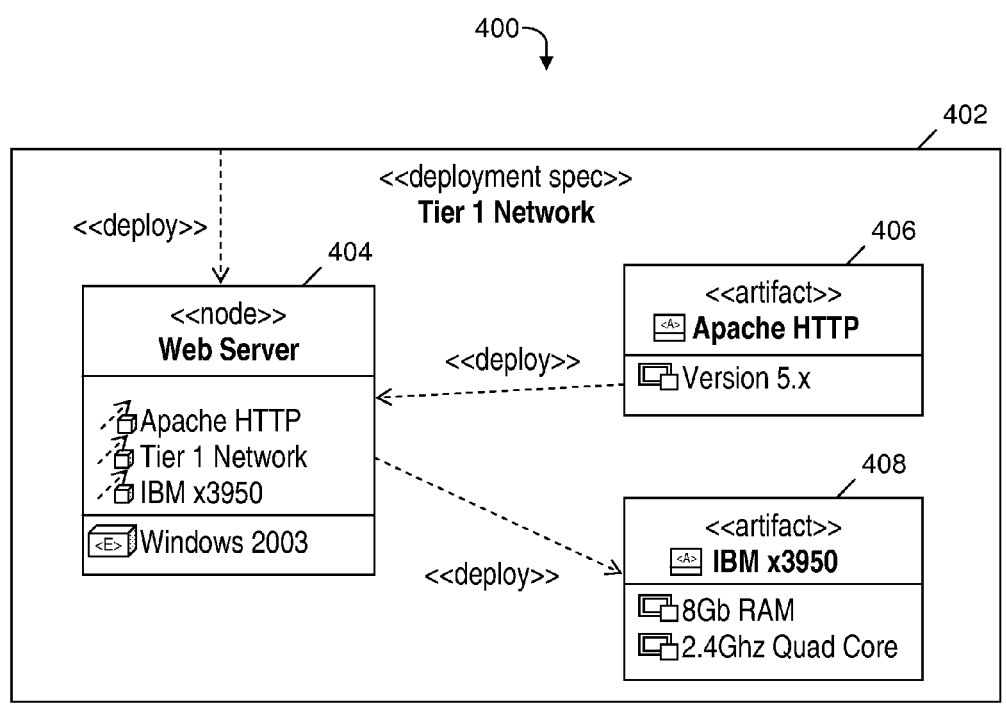
FIG. 4 is an example of a deployment model used in the process of FIG. 2, in accordance with embodiments of the present invention.

FIG. 4 is an example of a deployment model used in the process of FIG. 2, in accordance with embodiments of the present invention. Example 400 includes a Deployment Specification 402 representing a Tier 1 Network having a simple, single Node 404 representing a Web Server. The Web Server represented by Node 404 runs Apache HTTP, which is represented by a software package Artifact 406. Apache HTTP represented by Artifact 406 runs on IBM x3950, which is represented by a hardware specification Artifact 408. A Windows 2003 operating system (i.e., an Execution Environment) is located within the Web Server represented by Node 402. Example 400 also demonstrates the use of Attributes for Artifacts 406 and 408 (e.g., Attributes 8 Gb RAM and 2.4 Ghz Quad Core for Artifact 408).

5.4 Infrastructure Run Time Source Library

This subsection provides information on how a reference model is structured and how the reference model is used to populate a system model.

As models are developed, they may be harvested as reusable (reference) assets and published into an Asset Management tool such as the IBM® Rational® Asset Manager. Assets that are selected to be included for an environment may be uploaded into a Services Catalog to be included in a Self Service Provisioning toolset such as the IBM® Dynamic Infrastructure® Cloud.

5.5 Exporting a Model to XML

This section provides information on how to export a system model as an XML schema to be used as input to a build tool such as deployment tool 120 (see FIG. 1) or to define a reference configuration within configuration management system 122 (see FIG. 1).

UML 2.0 provides a direct mapping to XML via XML Metadata Interchange (XMI). Providing the modeling complies with UML 2.0, the system model may be exported and interpreted by any tooling with an XML interface.

6. Defect Management

Defect management of both the application bundle and the run time pattern may be tracked and change managed and the new baseline published. A scanning engine (not shown in FIG. 1) periodically scans the deployed environments against the published baseline and trigger an application or infrastructure release management process.

The release management process engages a provisioning system to complete the release, scans to ensure compliance to the baseline, and reports any defects or reports completion of the project.

7. Sample Traceability

Figure 5:
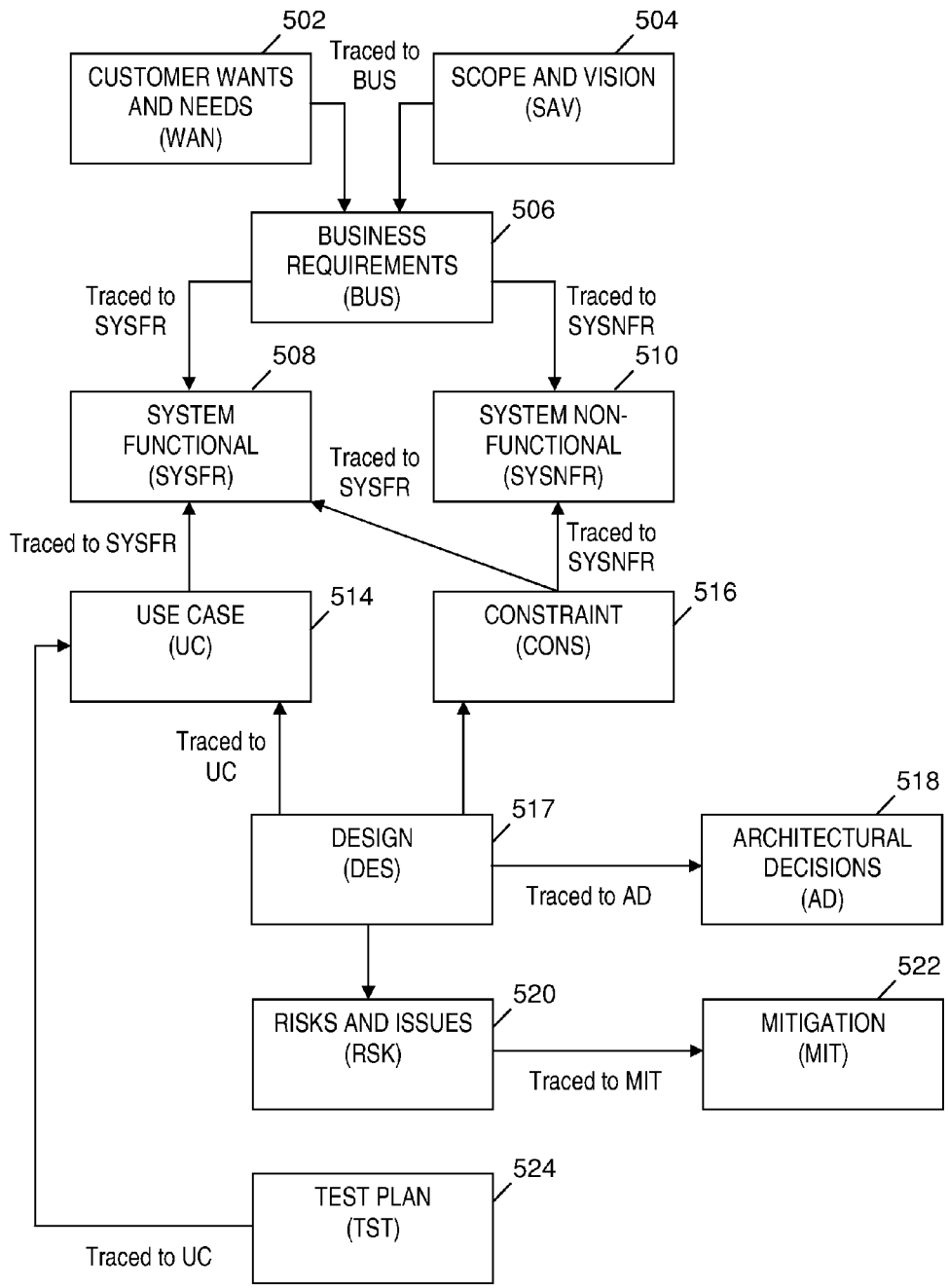
FIG. 5 is an example of a traceability diagram for tracing a design of an application being deployed in the process of FIG. 2 back to business requirements, in accordance with embodiments of the present invention.

FIG. 5 is an example of a traceability diagram for tracing a design of an application being deployed in the process of FIG. 2 back to business requirements, in accordance with embodiments of the present invention. The traceability diagram illustrates traceability between various types of requirements that are maintained during a project lifecycle, and may be used, for example, as part of a configuration document stored in an IBM® RequisitePro® database. The objective of the traceability is to reduce the number of defects found late in the development cycle for an application or IT system instance.

Customer Wants and Needs (WAN) 502 and Scope and Vision (SAV) 504 items are traced to a Business Requirements (BUS) item 506. WAN 502 are the customer-identified desirable characteristics of the system. SAV 504 are the key corporate and business statements that describe a high-level vision of the environment. BUS 506 captures key business requirements. BUS 506 is traced to a System Functional (SYSFR) item 508 representing the system's functional conditions and capabilities, and a System Non-Functional (SYS-NFR) item 510 representing the system's non-functional conditions and capabilities that are not captured in the use case model. There may be a many-to-many relationship between BUS 506 and SYSFR 508, and between BUS 506 and SYS-NFR 510, but usually the relationship is one business requirement to many system requirements.

SYSFR 508 and SYSNFR 510 are traced to either a Use Case (UC) requirement 514 or a Supplementary Requirement (not shown). There may be many-to-many relationships between SYSFR 508 and UC 514 and between SYSNFR 510 and UC 514.

UC 514 captures all the system's functional requirements and is traced back to SYSFR 508 and SYSNFR 510. Constraints (CONS) 516 identify the constraints that may or will limit the system's capabilities or overall design, and is traced to SYSFR 508 and SYSNFR 510. A Design (DES) item 517 captures the high-level design of the system and is traced to UC 514, CONS 516, and to Architectural Decisions (AD) 518. There may be many-to-many relationships between DES 517 and UC 514, CONS 516 and AD 518. AD 518 captures the decision items that influence the design outcome.

Risk and Issues (RSK) requirement 520 captures risks and their treatment, and is traced to Mitigation requirements 522, which captures mitigation strategies necessary to address identified risks. Test Plan (TST) requirements 524 are traced to UC requirements 514.

8. Computer System

Figure 6:
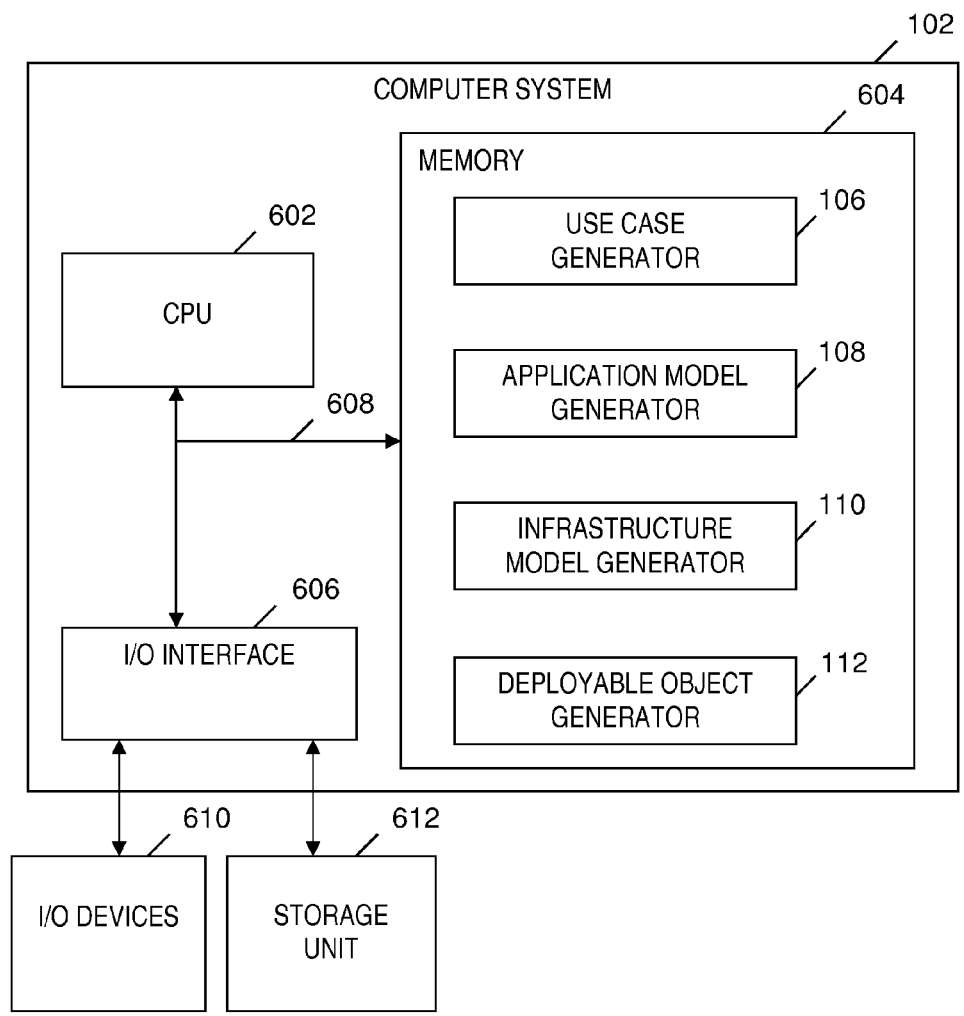
FIG. 6 is a block diagram of a computer system included in the system of FIG. 1 and that implements the process of FIG. 2, in accordance with embodiments of the present invention.

FIG. 6 is a block diagram of a computer system included in the system of FIG. 1 and that implements the process of FIG. 2, in accordance with embodiments of the present invention. Computer system 102 generally comprises a central processing unit (CPU) 602, a memory 604, an input/output (I/O) interface 606, and a bus 608. Further, computer system 102 is coupled to I/O devices 610 and a computer data storage unit 612. CPU 602 performs computation and control functions of computer system 102. CPU 602 may comprise a single processing unit, or be distributed across one or more processing units in one or more locations (e.g., on a client and server).

Memory 604 may comprise any known computer readable storage medium, which is described below. In one embodiment, cache memory elements of memory 604 provide temporary storage of at least some program code (e.g., program code 106, 106, 108, 110 and 112) in order to reduce the number of times code must be retrieved from bulk storage while instructions of the program code are carried out. Moreover, similar to CPU 602, memory 604 may reside at a single physical location, comprising one or more types of data storage, or be distributed across a plurality of physical systems in various forms. Further, memory 604 can include data distributed across, for example, a local area network (LAN) or a wide area network (WAN).

I/O interface 606 comprises any system for exchanging information to or from an external source. I/O devices 610 comprise any known type of external device, including a display device (e.g., monitor), keyboard, mouse, printer, speakers, handheld device, facsimile, etc. Bus 608 provides a communication link between each of the components in computer system 102, and may comprise any type of transmission link, including electrical, optical, wireless, etc.

I/O interface 606 also allows computer system 102 to store and retrieve information (e.g., data or program instructions such as program code 106, 108, 110 and 112) from an auxiliary storage device such as computer data storage unit 612 or another computer data storage unit (not shown). Computer data storage unit 612 may comprise any known computer readable storage medium, which is described below. For example, computer data storage unit 612 may be a non-volatile data storage device, such as a magnetic disk drive (i.e., hard disk drive) or an optical disc drive (e.g., a CD-ROM drive which receives a CD-ROM disk).

Memory 604 may store computer program code 106, 108, 110 and 112 that provides the logic for automatically deploying an application or IT system instance, and/or for determining an impact of a proposed change to an application or IT system instance prior to the deployment of the proposed change. Further, memory 604 may include other systems not shown in FIG. 6, such as an operating system (e.g., Linux) that runs on CPU 602 and provides control of various components within and/or connected to computer system 102.

Storage unit 612 and/or one or more other computer data storage units (not shown) that are coupled to computer system 102 may store the software source library 114 (see FIG. 1) and the infrastructure run time source library 116 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer readable medium(s) (e.g., memory 604 and/or computer data storage unit 612) having computer readable program code (e.g., program code 106, 108, 110 and 112) embodied or stored thereon.

Any combination of one or more computer readable medium(s) (e.g., memory 604 and computer data storage unit 612) may be utilized. The computer readable medium may be a computer readable signal medium or a computer readable storage medium. In one embodiment the computer readable storage medium is a computer readable storage device or computer readable storage apparatus. A computer readable storage medium may be, for example, but not limited to, an electronic, magnetic, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program (e.g., program 106, 108, 110 and 112) for use by or in connection with a system, apparatus, or device for carrying out instructions. Each of the terms "computer readable storage medium" and "computer readable storage device" does not include a signal propagation medium such as a copper cable, optical fiber or a wireless transmission medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 106, 108, 110 and 112) embodied on a computer readable medium may be transmitted using any appropriate medium, including but not limited to wireless, wireline, optical fiber cable, RF, etc., or any suitable combination of the foregoing.

Computer program code (e.g., program code 106, 108, 110 and 112) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2 and FIG. 3) and/or block diagrams of methods, apparatus (systems) (e.g., FIG. 1 and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 106, 108, 110 and 112). These computer program instructions may be provided to a processor (e.g., CPU 602) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 604 or computer data storage unit 612) that can direct a computer (e.g., computer system 102), other programmable data processing apparatus, or other devices to function in a particular manner, such that the instructions (e.g., program 106, 108, 110 and 112) stored in the computer readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 106, 108, 110 and 112) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of automatically deploying an application or IT system instance, and/or determining an impact of a proposed change to an application or IT system instance prior to the deployment of the proposed change. Thus, an embodiment of the present invention discloses a process for supporting computer infrastructure, wherein the process comprises providing at least one support service for at least one of integrating, hosting, maintaining and deploying computer-readable code (e.g., program code 106, 108, 110 and 112) in a computer system (e.g., computer system 102 in FIG. 6) comprising a processor, wherein the processor carries out instructions contained in the code causing the computer system to perform a method of automatically deploying an application or IT system instance, and/or determining an impact of a proposed change to an application or IT system instance prior to the deployment of the proposed change.

In another embodiment, the invention provides a business method that performs the process steps of the invention on a subscription, advertising and/or fee basis. That is, a service provider, such as a Solution Integrator, can offer to create, maintain, support, etc. a process of automatically deploying an application or IT system instance, and/or determining an impact of a proposed change to an application or IT system instance prior to the deployment of the proposed change. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2 and FIG. 3 and the block diagrams in FIG. 1 and FIG. 6 illustrate the architecture, functionality, and operation of possible implementations of systems, methods, and computer program products according to various embodiments of the present invention. In this regard, each block in the flowchart or block diagrams may represent a module, segment, or portion of code (e.g., program code 106, 108, 110 and 112), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of automatically deploying an information technology (IT) system instance having hardware and software components, said method comprising:
   receiving, by a computer system, functional requirements of said IT system instance;
   receiving, by said computer system, non-functional requirements of said IT system instance;
   subsequent to said receiving said functional requirements, generating, by said computer system, use cases describing said functional requirements of said IT system instance;
   subsequent to said generating said use cases and based on components consisting of said use cases, system context diagrams, component models, operational models, and data flow diagrams, generating, by said computer system, an application model of said software components, wherein said generating said application model includes representing said software components in a software component modeling language;
   based on said application model and said generated use cases, generating, by said computer system, an infrastructure model of infrastructure components consisting of an operating system, middleware, and a specification of a physical environment required to host said software components, wherein said generating said infrastructure model includes representing said hardware components in said software component modeling language;
   based on said application model and said infrastructure model, generating, by said computer system, a computer file in a markup language, wherein said computer file includes a design of said IT system instance having said hardware and software components, and further includes first instructions for accessing first assets stored in an infrastructure runtime source library and second instructions for accessing second assets stored in a software source library, and wherein said first assets specify said hardware components and said second assets specify said software components; and
   exporting, by said computer system, said computer file in said markup language to a deployment tool, wherein a result of said exporting said computer file to said deployment tool is an automatic deployment of said IT system instance based on carrying out said first and second instructions included in said computer file to access said first and second assets stored in said infrastructure runtime source library and said software source library, respectively, wherein said generating said application model, said generating said infrastructure model based on said application model, said generating said computer file in said markup language, said exporting said computer file to said deployment tool, and said automatic deployment of said IT system instance resulting from said exporting said computer file to said deployment tool are steps performed automatically in succession without a human-performed step being performed between any of said steps,
   wherein said computer system includes software-based generators that consist of first, second, third and fourth software-based generators which perform said steps, wherein said first generator is a use case generator that performs said generating said use cases, wherein said second generator is an application model generator that performs said generating said application model of said software components, wherein said third generator is an infrastructure model generator the performs said generating said infrastructure model, and wherein said fourth generator is a deployable object generator that performs said generating said computer file in said markup language.

2. The method of claim 1, wherein said design of said IT system instance is a single system model that links said infrastructure model and said application model based on said software component modeling language representing said hardware components of said infrastructure model and said software components of said application model.

3. The method of claim 1, further comprising:
   receiving, by said computer system, a change to a functional requirement included in said received functional requirements or a non-functional requirement included in said received non functional requirements;
   prior to an initiation of said automatic deployment of said IT system instance, determining, by said computer system, an update to said design of said IT system instance based on said change to said functional or non-functional requirement, and based on said software component modeling language being used to represent said hardware components and said software components and being used to link said hardware and software components to said functional and non-functional requirements; and
   prior to said initiation of said automatic deployment of said IT system instance and subsequent to said determining said update to said design of said IT system instance, determining, by said computer system, a cost of deploying said IT system instance based on said update to said design of said IT system instance.

4. The method of claim 1, wherein said generating said infrastructure model further includes generating a Unified Modeling Language (UML) model of an infrastructure required to implement said IT system instance, said infrastructure including said hardware components, wherein said UML model of said infrastructure includes:
   a first node that represents an instantiation of a first physical device required in said infrastructure;
   a second node that represents an instantiation of a second physical device required in said infrastructure;
   a first artifact that represents one or more hardware specifications of said first physical device;
   a second artifact that represents a software package required to be installed on said first physical device;
   one or more attributes that provide information about a configuration of said first node, said second node, said first artifact or said second artifact;
   a communication path that represents a connectivity between said first and second nodes and indicates a communication protocol required for said connectivity;

association lines that indicate that said first and second artifacts are part of said first node;
a deployment specification that represents a security zone or a location of said infrastructure; and
an execution environment that represents an operating system or a bundle of software packages represented by artifacts of said UML model.

5. The method of claim 1, wherein said software component modeling language is Unified Modeling Language (UML), and wherein said generating said computer file in said markup language includes generating said computer file in Extensible Markup Language (XML) based on said UML providing a direct mapping of said infrastructure model to XML via XML Metadata Interchange (XMI).

6. The method of claim 5, wherein said exporting said computer file includes exporting said computer file in XML to said deployment tool, wherein a result of said exporting said computer file is an interpretation of said computer file by said deployment tool via an XML interface.

7. The method of claim 1, wherein said method further comprises, prior to said generating said infrastructure model:
generating, by said computer system, one or more other infrastructure models that represent said hardware components; and
storing, in said infrastructure runtime source library and by said computer system, said first assets as reusable assets that specify said hardware components based on said generated one or more other infrastructure models, wherein said generating said computer file includes retrieving said reusable assets that specify said hardware components from said infrastructure runtime source library subsequent to said storing said first assets as said reusable assets.

8. The method of claim 1, further comprising:
subsequent to said exporting said computer file and based on said design of said IT system instance, automatically deploying, by said computer system, said IT system instance;
exporting, by said computer system, said design of said IT system instance to a configuration management system;
identifying, by said computer system, said design of said IT system instance as a first baseline of said IT system instance;
detecting, by said computer system, a first change in said IT system instance;
receiving, by said computer system and from said configuration management system, an indication of said first change in said IT system instance;
subsequent to said receiving said indication of said first change in said IT system instance, updating, by said computer system, said design of said IT system instance to a second design of said IT system instance that includes said first change and exporting a second computer file in said markup language to said configuration management system, wherein said second computer file includes said second design of said IT system instance, and wherein a result of said exporting said second computer file is an identification of said second design of said IT system instance as an updated baseline of said IT system instance by said configuration management system;
subsequent to said exporting said second computer file that includes said second design of said IT system instance that includes said first change, receiving and modeling, by said computer system, a proposed change to said IT system instance prior to a deployment of said IT system instance having said proposed change, wherein said modeling said proposed change is based on said updated baseline of said IT system instance rather than said first baseline of said IT system instance;
prior to an initiation of an automatic deployment of said IT system instance having said proposed change, determining, by said computer system, an update of said second design of said IT system instance to a third design of said IT system instance based on said proposed change; and
prior to said initiation of said automatic deployment of said IT system instance having said proposed change and subsequent to said determining said update of said second design of said IT system instance to said third design of said IT system instance, determining, by said computer system, a cost of deploying said IT system instance based on said update of said second design of said IT system instance to said third design of said IT system instance.

9. The method of claim 8, further comprising providing at least one support service for at least one of creating, integrating, hosting, maintaining, and deploying computer-readable code in said computer system comprising a processor, said computer-readable code being executed by the processor to implement said receiving said functional requirements, said receiving said non-functional requirements, said generating said use cases, said generating said computer file, said exporting said computer file, said deploying said IT system instance, said exporting said design of said IT system instance, said identifying said design of said IT system instance as said first baseline, said detecting said first change, said receiving said indication of said first change, said updating said design of said IT system instance to said second design, said exporting said second computer file, said receiving and modeling said proposed change, said determining said update of said second design, and said determining said impact of said proposed change.

10. A computer program product, comprising:
a computer readable memory; and
a computer readable program code stored in the computer readable memory, said computer readable program code containing instructions that are carried out by a processor of a computer system to implement a method of automatically deploying an information technology (IT) system instance having hardware and software components, said method comprising:
receiving functional requirements of said IT system instance;
receiving non-functional requirements of said IT system instance;
subsequent to said receiving said functional requirements, generating use cases describing said functional requirements of said IT system instance;
subsequent to said generating said use cases and based on components consisting of said use cases, system context diagrams, component models, operational models, and data flow diagrams, generating an application model of said software components, wherein said generating said application model includes representing said software components in a software component modeling language;
based on said application model and said generated use cases, generating an infrastructure model of infrastructure components consisting of an operating system, middleware, and a specification of a physical environment required to host said software components, wherein said generating said infrastructure model includes representing said hardware components in said software component modeling language;

based on said application model and said infrastructure model, generating a computer file in a markup language, wherein said computer file includes a design of said IT system instance having said hardware and software components, and further includes first instructions for accessing first assets stored in an infrastructure runtime source library and second instructions for accessing second assets stored in a software source library, and wherein said first assets specify said hardware components and said second assets specify said software components; and exporting said computer file in said markup language to a deployment tool, wherein a result of said exporting said computer file to said deployment tool is an automatic deployment of said IT system instance based on carrying out said first and second instructions included in said computer file to access said first and second assets stored in said infrastructure runtime source library and said software source library, respectively, wherein said generating said application model, said generating said infrastructure model based on said application model, said generating said computer file in said markup language, said exporting said computer file to said deployment tool, and said automatic deployment of said IT system instance resulting from said exporting said computer file to said deployment tool are steps performed automatically in succession without a human-performed step being performed between any of said steps, wherein said computer system includes software-based generators that consist of first, second, third and fourth software-based generators which perform said steps, wherein said first generator is a use case generator that performs said generating said use cases, wherein said second generator is an application model generator that performs said generating said application model of said software components, wherein said third generator is an infrastructure model generator the performs said generating said infrastructure model, and wherein said fourth generator is a deployable object generator that performs said generating said computer file in said markup language.

11. The program product of claim 10, wherein said design of said IT system instance is a single system model that links said infrastructure model and said application model based on said software component modeling language representing said hardware components of said infrastructure model and said software components of said application model.

12. The program product of claim 10, wherein said method further comprises:

said computer system receiving a change to a functional requirement included in said received functional requirements or a non-functional requirement included in said received non-functional requirements;

prior to an initiation of said automatic deployment of said IT system instance, determining an update to said design of said IT system instance based on said change to said functional or non-functional requirement, and based on said software component modeling language being used to represent said hardware components and said software components and being used to link said hardware and software components to said functional and non-functional requirements; and prior to said initiation of said automatic deployment of said IT system instance and subsequent to said determining said update to said design of said IT system instance, determining a cost of deploying said IT system instance based on said update to said design of said IT system instance.

13. The program product of claim 10, wherein said generating said infrastructure model further includes generating a Unified Modeling Language (UML) model of an infrastructure required to implement said IT system instance, said infrastructure including said hardware components, wherein said UML model of said infrastructure includes:

a first node that represents an instantiation of a first physical device required in said infrastructure;

a second node that represents an instantiation of a second physical device required in said infrastructure;

a first artifact that represents one or more hardware specifications of said first physical device;

a second artifact that represents a software package required to be installed on said first physical device;

one or more attributes that provide information about a configuration of said first node, said second node, said first artifact or said second artifact;

a communication path that represents a connectivity between said first and second nodes and indicates a communication protocol required for said connectivity;

association lines that indicate that said first and second artifacts are part of said first node;

a deployment specification that represents a security zone or a location of said infrastructure; and an execution environment that represents an operating system or a bundle of software packages represented by artifacts of said UML model.

14. The program product of claim 10, wherein said software component modeling language is Unified Modeling Language (UML), and wherein said generating said computer file in said markup language includes generating said computer file in Extensible Markup Language(XML) based on said UML providing a direct mapping of said infrastructure model to XML via XML Metadata Interchange (XMI).

15. The program product of claim 14, wherein said exporting said computer file includes exporting said computer file in XML to said deployment tool, wherein a result of said exporting said computer file is an interpretation of said computer file by said deployment tool via an XML interface.

16. The program product of claim 10, wherein said method further comprises, prior to said generating said infrastructure model:

generating one or more other infrastructure models that represent said hardware components; and storing, in said infrastructure runtime source library, said first assets as reusable assets that specify said hardware components based on said generated one or more other infrastructure models, wherein said generating said computer file includes retrieving said reusable assets that specify said hardware components from said infrastructure runtime source library subsequent to said storing said first assets as said reusable assets.

17. The program product of claim 10, wherein said method comprises:

subsequent to said exporting said computer file and based on said design of said IT system instance, automatically deploying said IT system instance;

exporting said design of said IT system instance to a configuration management system;

identifying said design of said IT system instance as a first baseline of said IT system instance;

detecting a first change deployed in said IT system instance;

receiving an indication of said first change exported from said configuration management system;

subsequent to said receiving said indication of said first change deployed in said IT system instance, updating said design of said IT system instance to a second design of said IT system instance that includes said first change and exporting a second computer file in said markup language to said configuration management system, wherein said second computer file includes said second design of said IT system instance, and wherein a result of said exporting said second computer file is an identification of said second design of said IT system instance as an updated baseline of said IT system instance by said configuration management system;

subsequent to said exporting said second computer file that includes said second design of said IT system instance that includes said first change, receiving and modeling a proposed change to said IT system instance prior to a deployment of said IT system instance having said proposed change, wherein said modeling said modeling said proposed change is based on said updated baseline of said IT system instance rather than said first baseline of said IT system instance;

prior to an initiation of an automatic deployment of said IT system instance having said proposed change, determining an update of said second design of said IT system instance to a third design of said IT system instance based on said proposed change; and prior to said initiation of said automatic deployment of said IT system instance having said proposed change and subsequent to said determining said update of said second design of said IT system instance to said third design of said IT system instance, determining a cost of deploying said IT system instance based on said update of said second design of said IT system instance to said third design of said IT system instance.

18. A process for supporting computing infrastructure, said process comprising providing at least one support service for at least one of creating, integrating, hosting, maintaining, and deploying computer-readable code in a computer system comprising a processor, wherein said processor carries out instructions contained in said code causing said computer system to perform a method of automatically deploying an information technology (IT) system instance having hardware and software components, wherein said method comprises:

receiving, by said computer system, functional requirements of said IT system instance;

receiving, by said computer system, non-functional requirements of said IT system instance;

subsequent to said receiving said functional requirements, generating, by said computer system, use cases describing said functional requirements of said IT system instance;

subsequent to said generating said use cases and based on components consisting of said use cases, system context diagrams, component models, operational models, and data flow diagrams, generating, by said computer system, an application model of said software components, wherein said generating said application model includes representing said software components in a software component modeling language;

based on said application model and said generated use cases, generating, by said computer system, an infrastructure model of infrastructure components consisting of an operating system, middleware, and a specification of a physical environment required to host said software components, wherein said generating said infrastructure model includes representing said hardware components in said software component modeling language;

based on said application model and said infrastructure model, generating, by said computer system, a computer file in a markup language, wherein said computer file includes a design of said IT system instance having said hardware and software components, and further includes first instructions for accessing first assets stored in an infrastructure runtime source library and second instructions for accessing second assets stored in a software source library, and wherein said first assets specify said hardware components and said second assets specify said software components; and exporting, by said computer system, said computer file in said markup language to a deployment tool, wherein a result of said exporting said computer file to said deployment tool is an automatic deployment of said IT system instance based on carrying out said first and second instructions included in said computer file to access said first and second assets stored in said infrastructure runtime source library and said software source library, respectively, wherein said generating said application model, said generating said infrastructure model based on said application model, said generating said computer file in said markup language, said exporting said computer file to said deployment tool, and said automatic deployment of said IT system instance resulting from said exporting said computer file to said deployment tool are performed automatically in succession without a human-performed step being performed between any of said steps, wherein said computer system includes software-based generators that consist of first, second, third and fourth software-based generators which perform said steps, wherein said first generator is a use case generator that performs said generating said use cases, wherein said second generator is an application model generator that performs said generating said application model of said software components, wherein said third generator is an infrastructure model generator the performs said generating said infrastructure model, and wherein said fourth generator is a deployable object generator that performs said generating said computer file in said markup language.

19. The process of claim 18, wherein said design of said IT system instance is a single system model that links said infrastructure model and said application model based on said software component modeling language representing said hardware components of said infrastructure model and said software components of said application model.

20. The process of claim 18, wherein said method further comprises:

receiving, by said computer system, a change to a functional requirement included in said received functional requirements or a non-functional requirement included in said received non functional requirements;

prior to an initiation of said automatic deployment of said IT system instance, determining an update to said design of said IT system instance based on said change to said functional or non-functional requirement, and based on said software component modeling language being used to represent said hardware components and said software components and being used to link said hardware and software components to said functional and non-functional requirements; and prior to said initiation of said automatic deployment of said IT system instance and subsequent to said determining said update to said design of said IT system instance, determining a cost of deploying said IT system instance based on said update to said design of said IT system instance.

21. The process of claim 18, wherein said generating said infrastructure model further includes generating a Unified Modeling Language (UML) model of an infrastructure required to implement said IT system instance, said infrastructure including said hardware components, wherein said UML model of said infrastructure includes:

a first node that represents an instantiation of a first physical device required in said infrastructure;

a second node that represents an instantiation of a second physical device required in said infrastructure;

a first artifact that represents one or more hardware specifications of said first physical device;

a second artifact that represents a software package required to be installed on said first physical device;

one or more attributes that provide information about a configuration of said first node, said second node, said first artifact or said second artifact;

a communication path that represents a connectivity between said first and second nodes and indicates a communication protocol required for said connectivity;

association lines that indicate that said first and second artifacts are part of said first node;

a deployment specification that represents a security zone or a location of said infrastructure; and an execution environment that represents an operating system or a bundle of software packages represented by artifacts of said UML model.

* * * * *